Figure 2:
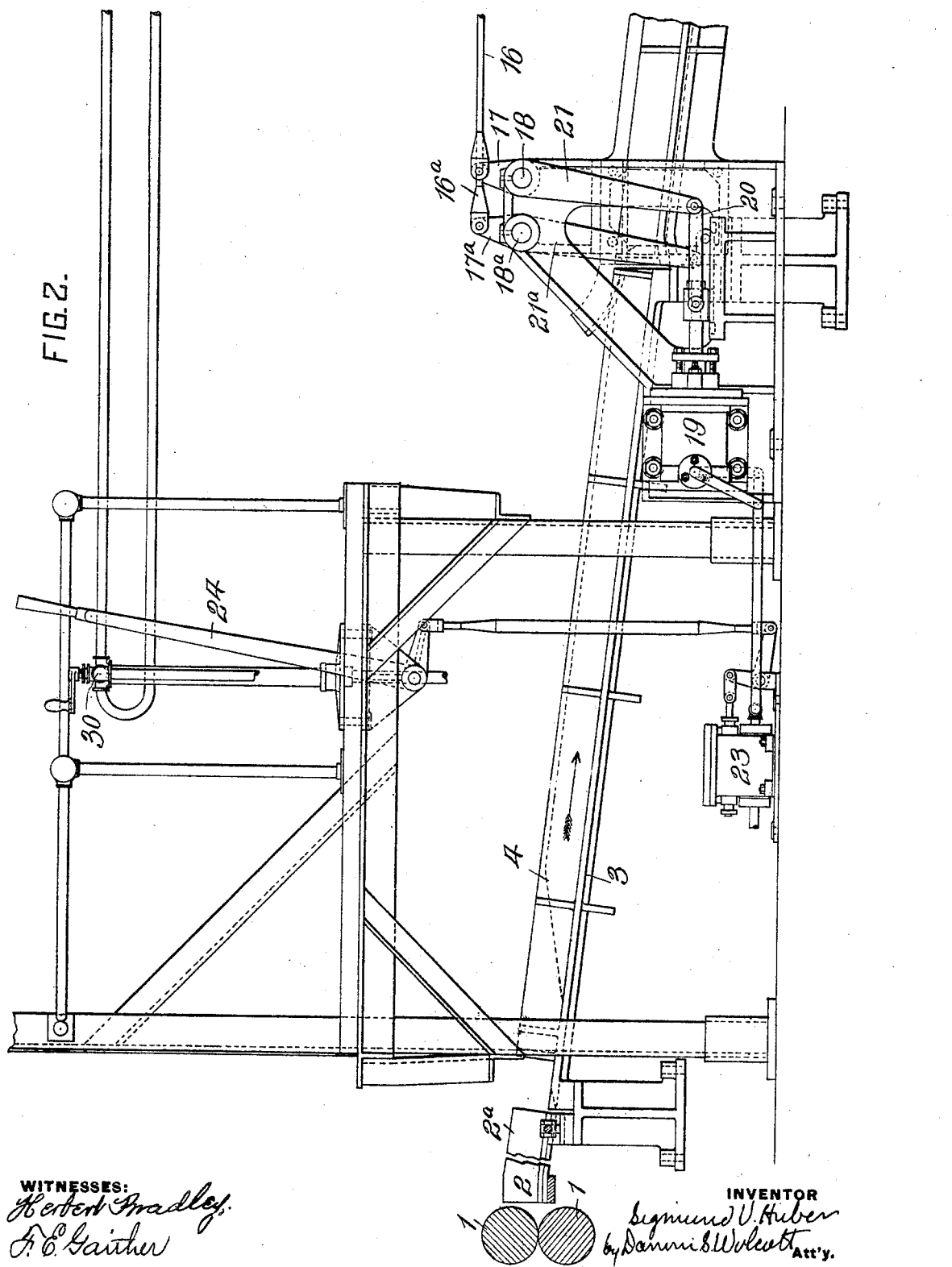
Figure 2:
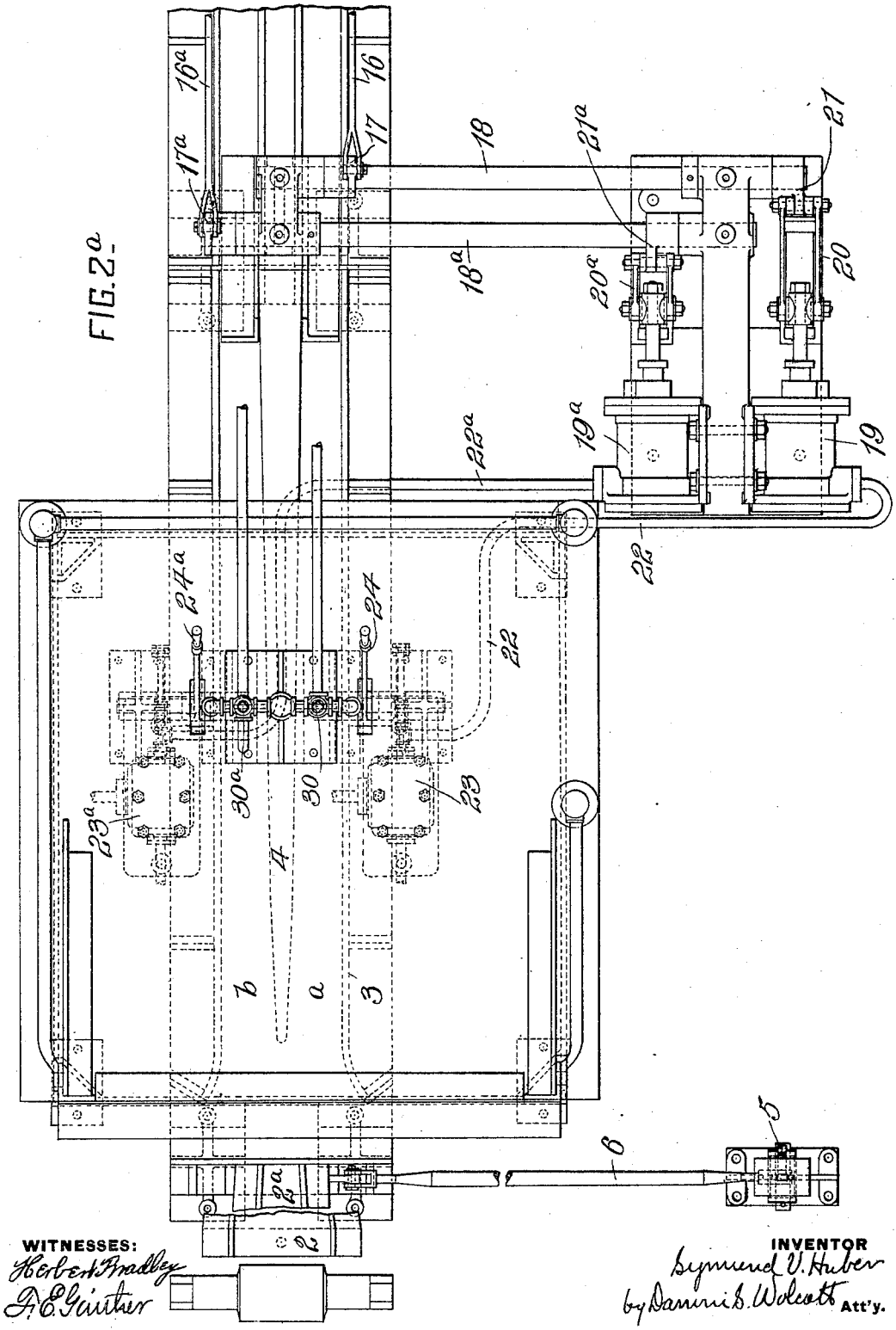
Figure 6:
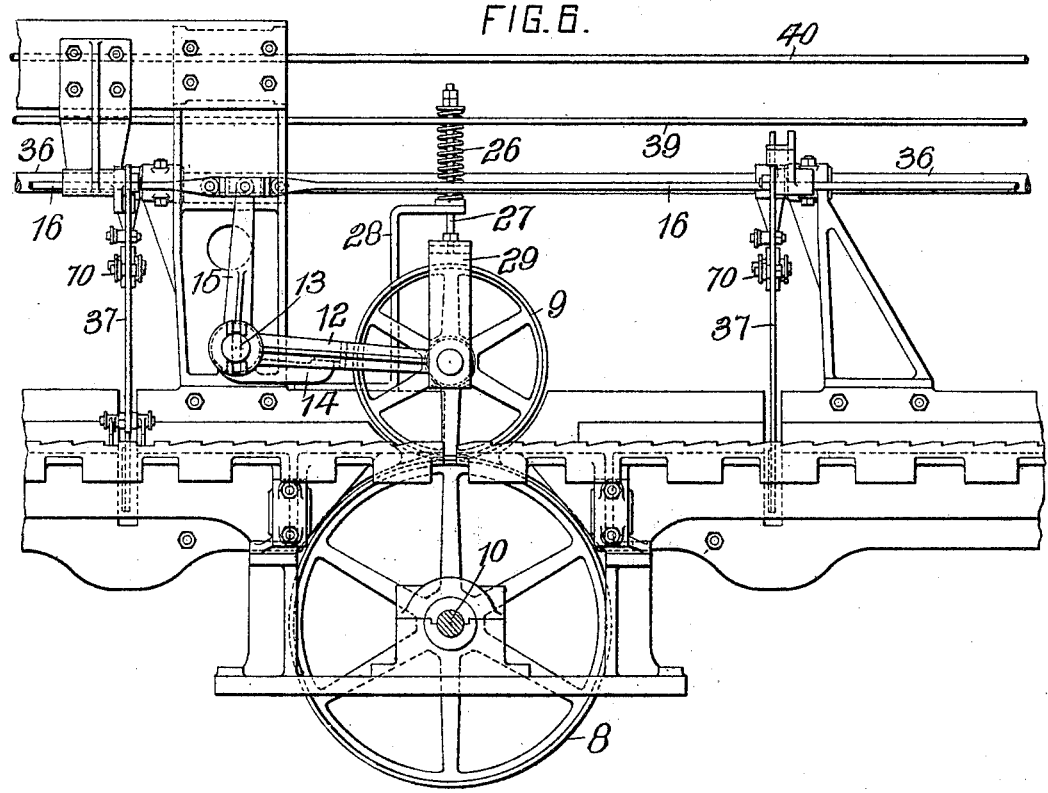

No. 681,642. Patented Aug. 27, 1901.
S. V. HUBER.
RUN-OUT MECHANISM FOR ROLLING MILLS.
(Application filed Jan. 12, 1901.)

(No Model.) 22 Sheets—Sheet 1.

FIG. 1.

WITNESSES:
Herbert Bradley.
F. E. Gaither.

INVENTOR,
Sigmund V. Huber
by Damon S. Wolcott
Att'y.

No. 681,642. Patented Aug. 27, 1901.
S. V. HUBER.
RUN-OUT MECHANISM FOR ROLLING MILLS.
(Application filed Jan. 12, 1901.)
(No Model.)
22 Sheets—Sheet 2.

WITNESSES:
Herbert Bradley
F. E. Gaither

INVENTOR
Sigmund V. Huber
by Dennis B. Wolcott Att'y.

No. 681,642. Patented Aug. 27, 1901.
S. V. HUBER.
RUN-OUT MECHANISM FOR ROLLING MILLS.
(Application filed Jan. 12, 1901.)
(No Model.) 22 Sheets—Sheet 3.

WITNESSES:
INVENTOR

No. 681,642.  
S. V. HUBER.  
RUN-OUT MECHANISM FOR ROLLING MILLS.  
(Application filed Jan. 12, 1901.)  
Patented Aug. 27, 1901.
(No Model.)  
22 Sheets—Sheet 4.
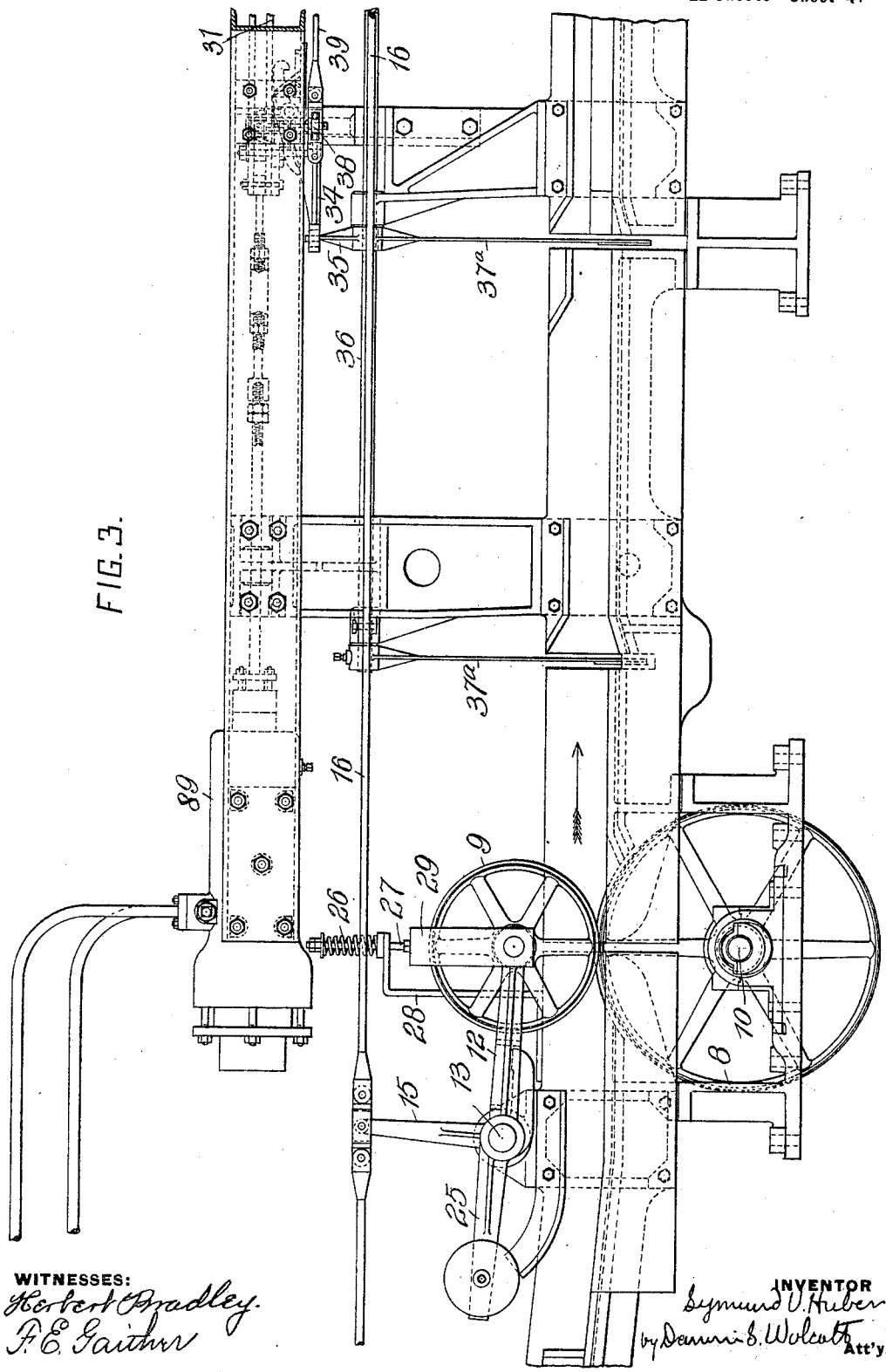
WITNESSES:  
Herbert Bradley  
F. E. Gaither
INVENTOR  
Sigmund V. Huber  
by Dennis S. Wolcott Att'y.

No. 681,642. Patented Aug. 27, 1901.
S. V. HUBER.
RUN-OUT MECHANISM FOR ROLLING MILLS.
(Application filed Jan. 12, 1901.)
(No Model.) 22 Sheets—Sheet 5.
FIG. 3ª.
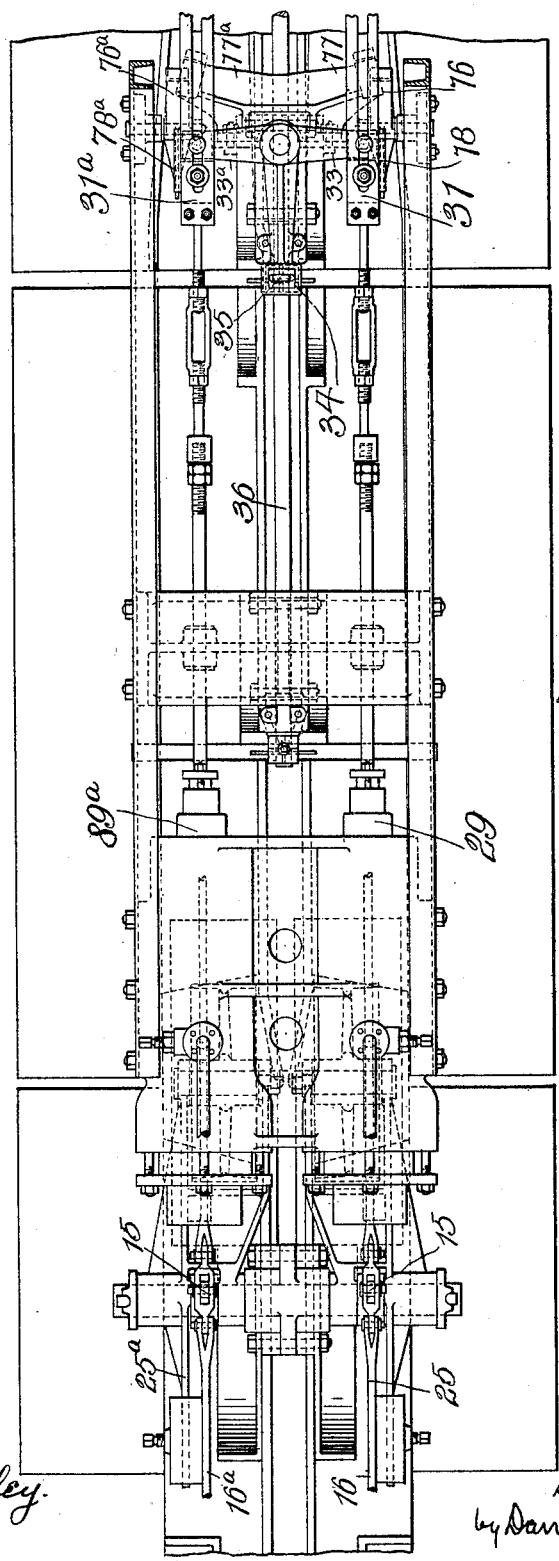
WITNESSES: INVENTOR
Herbert Bradley. Sigmund V. Huber
F. E. Gaither by Dennis S. Wolcott Att'y.
THE NORRIS PETERS CO., PHOTO-LITHO., WASHINGTON, D. C.

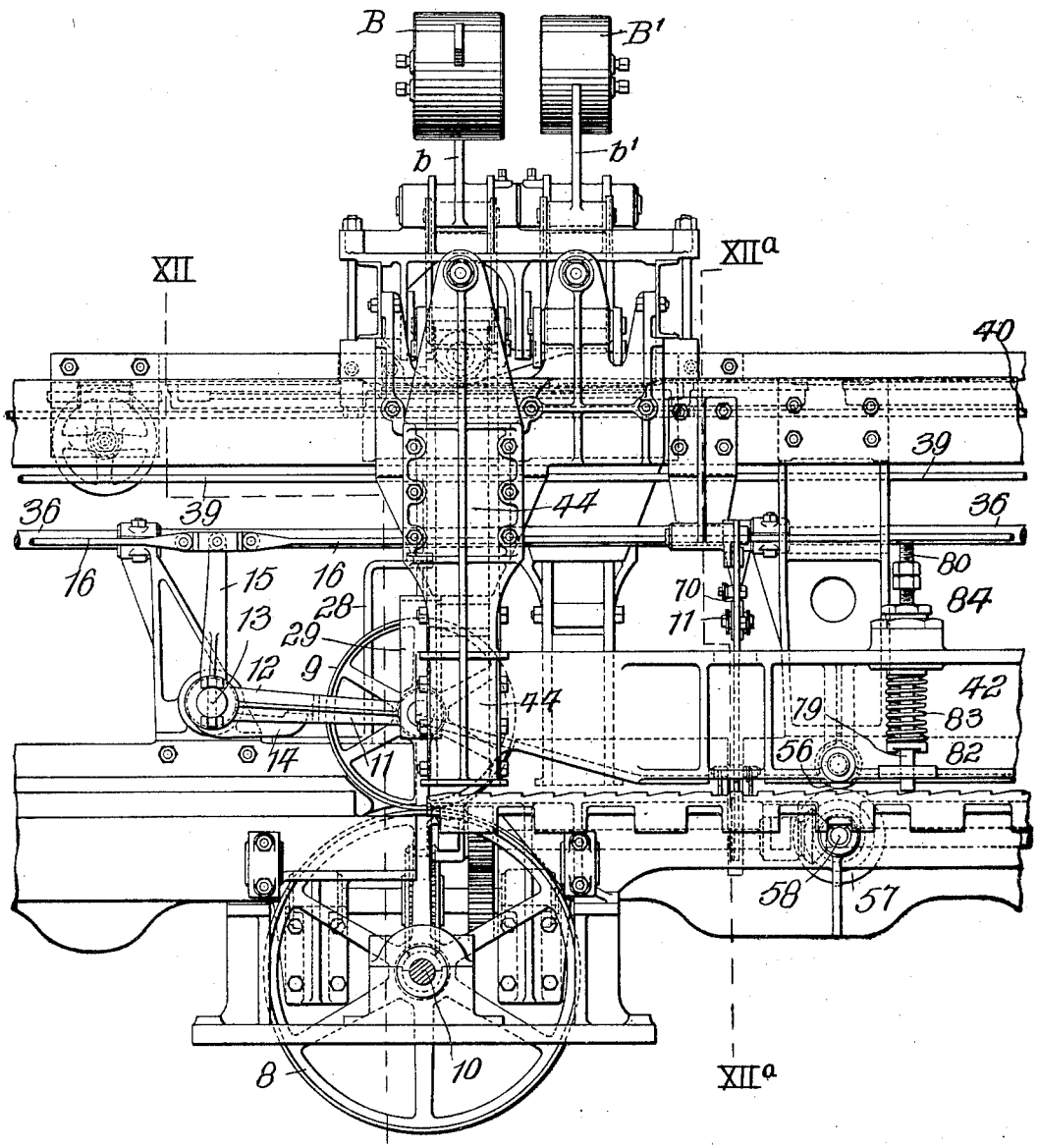

No. 681,642. Patented Aug. 27, 1901.
S. V. HUBER.
RUN-OUT MECHANISM FOR ROLLING MILLS.
(Application filed Jan. 12, 1901.)
(No Model.) 22 Sheets—Sheet 7.
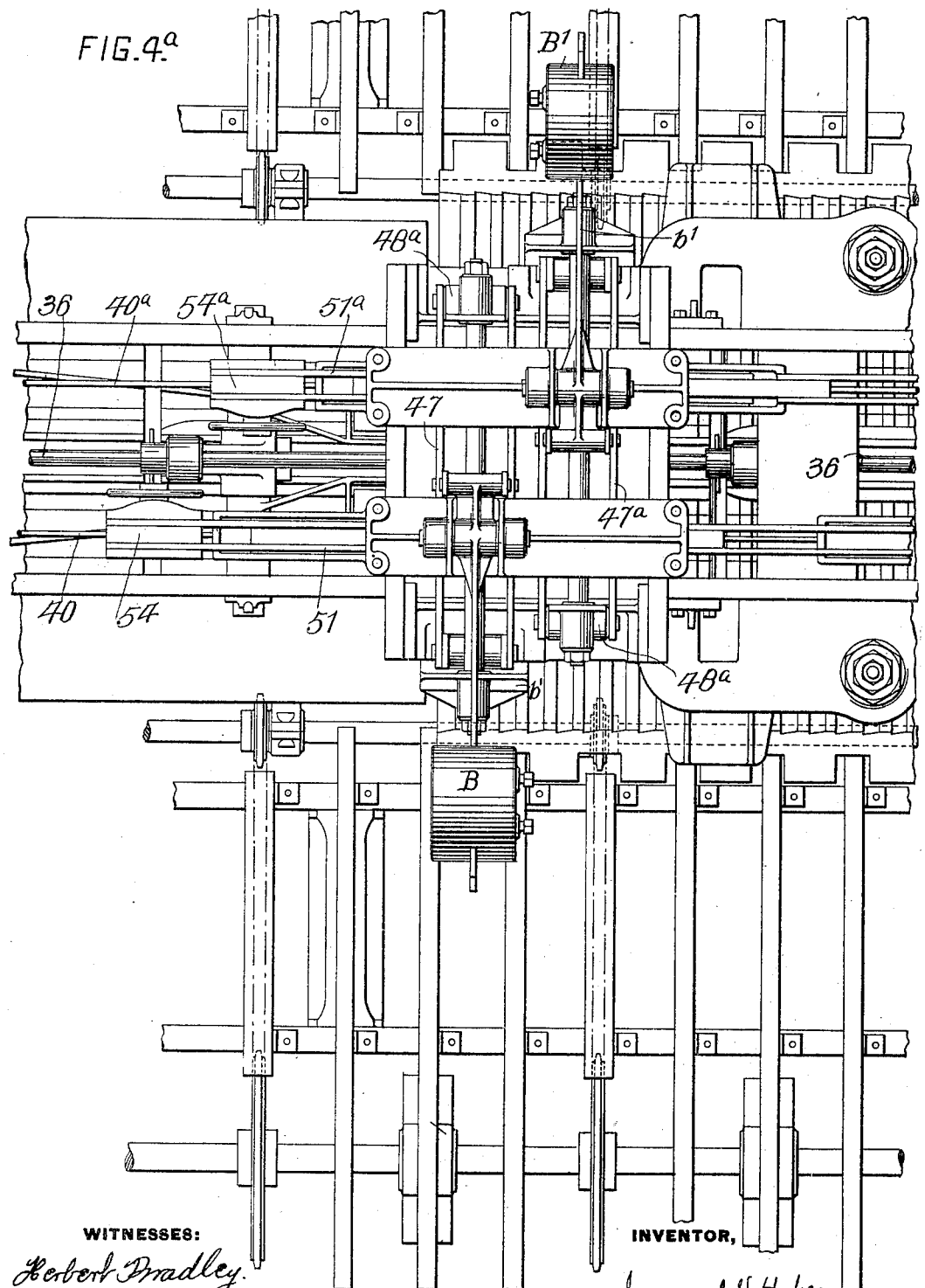

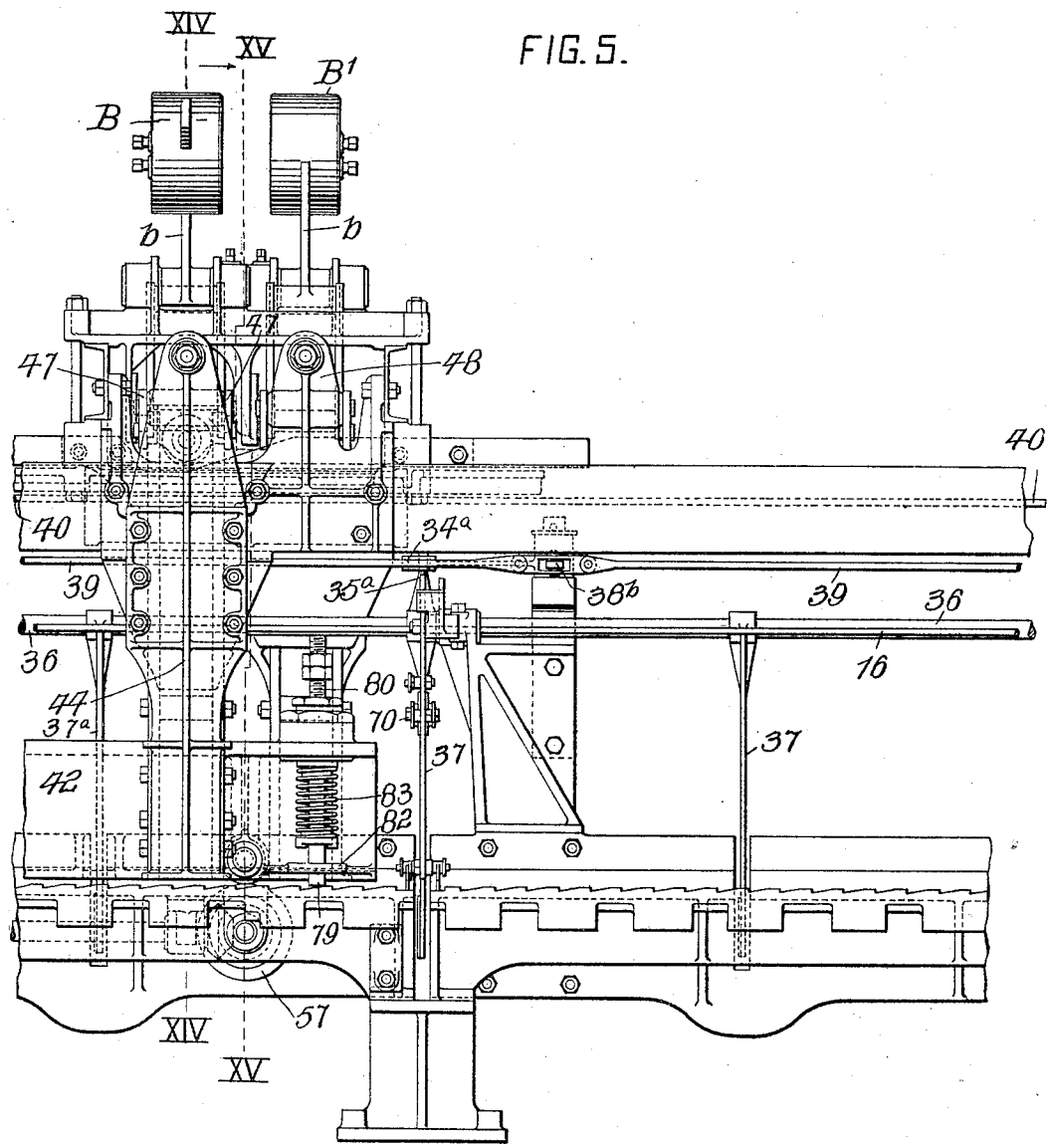

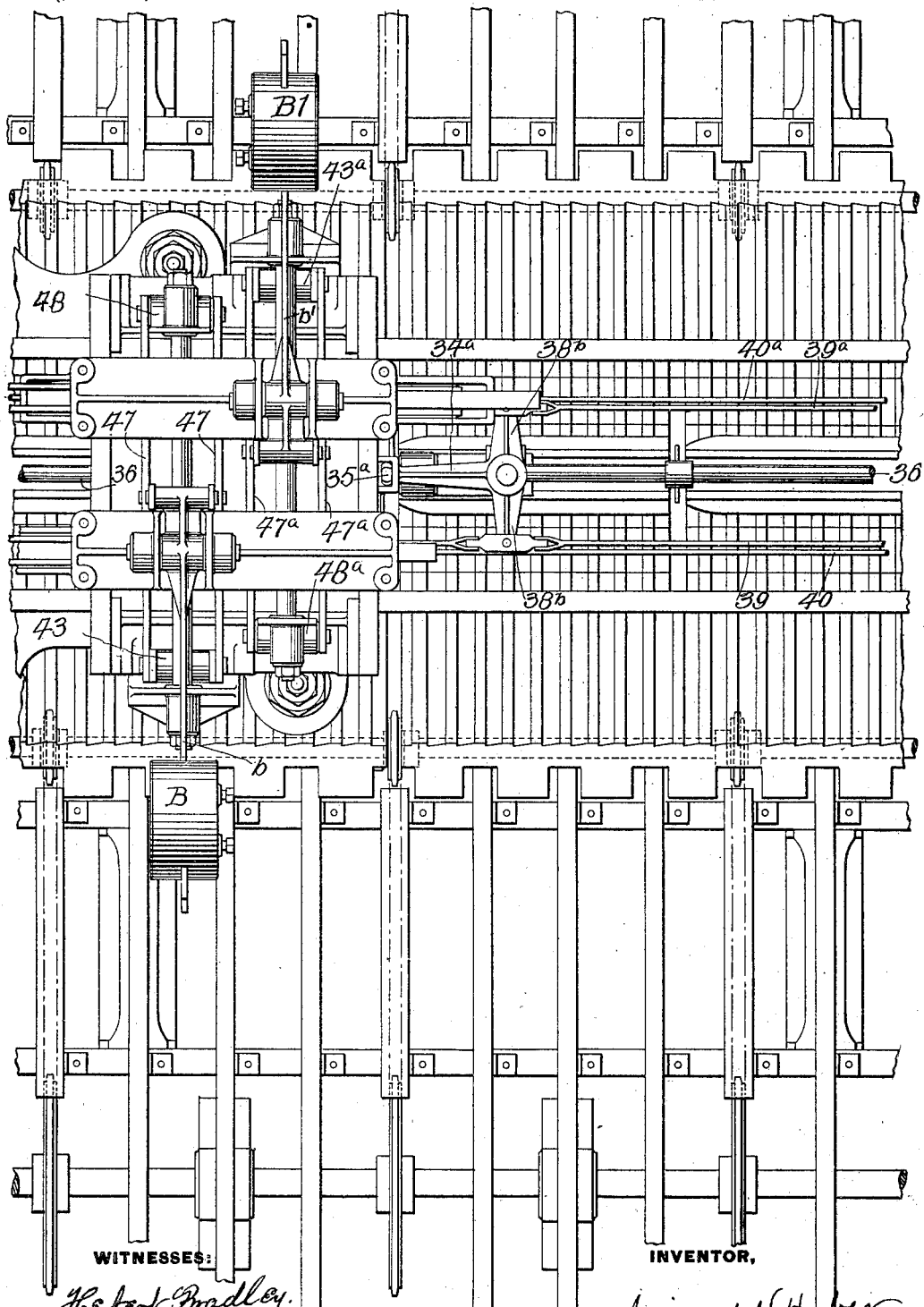
FIG. 5ª

No. 681,642. Patented Aug. 27, 1901.
S. V. HUBER.
RUN-OUT MECHANISM FOR ROLLING MILLS.
(Application filed Jan. 12, 1901.)
(No Model.) 22 Sheets—Sheet 10.

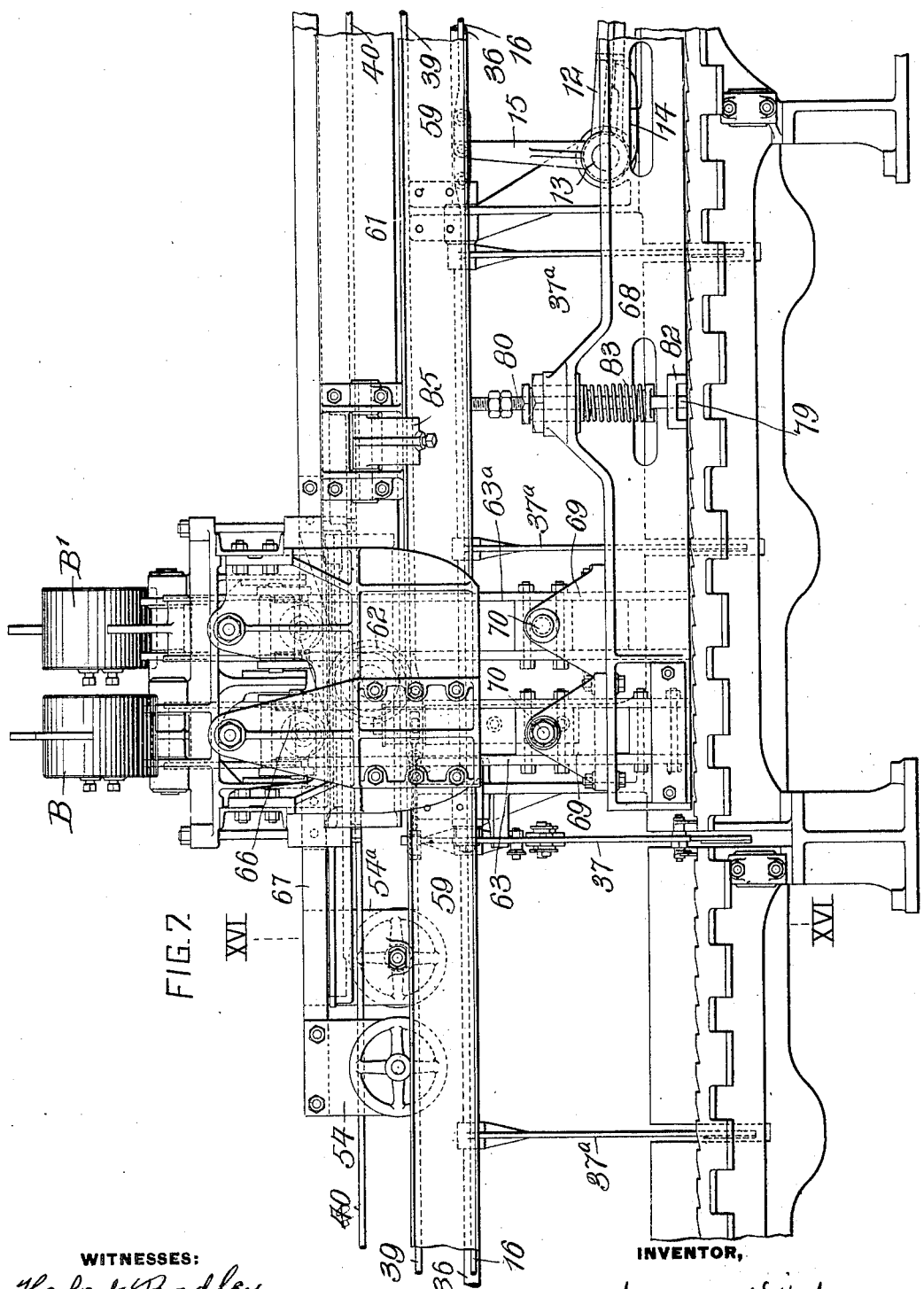

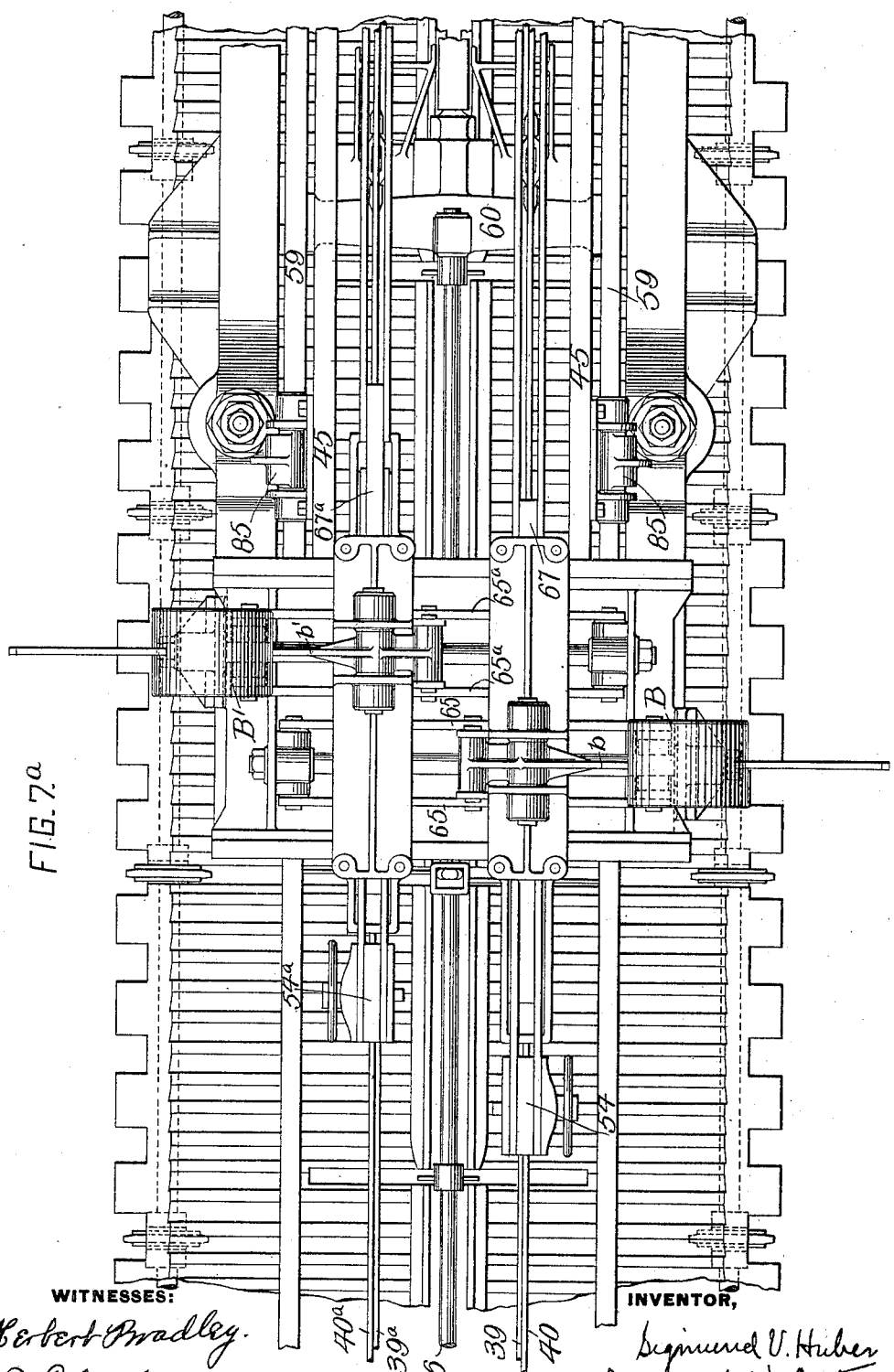

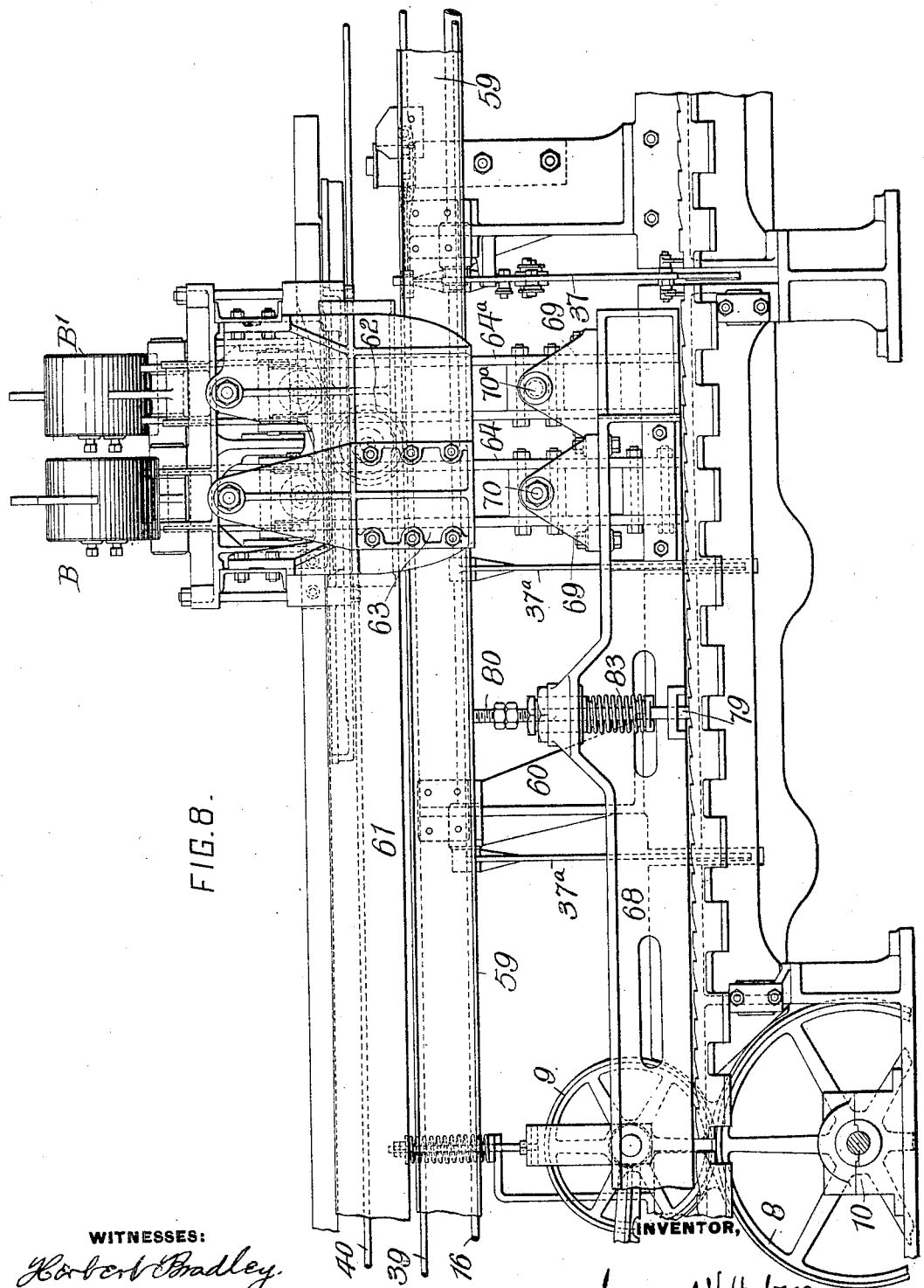

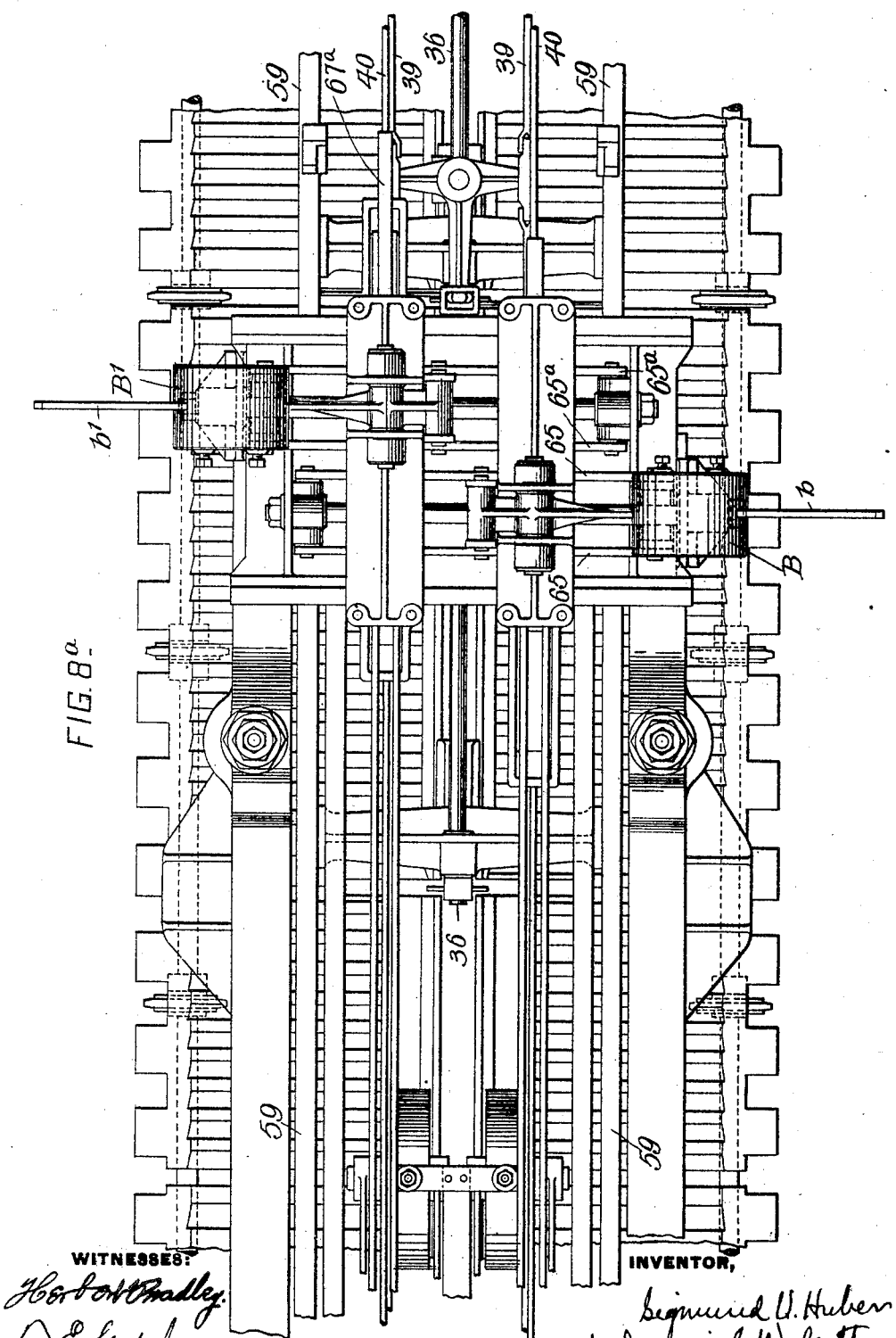

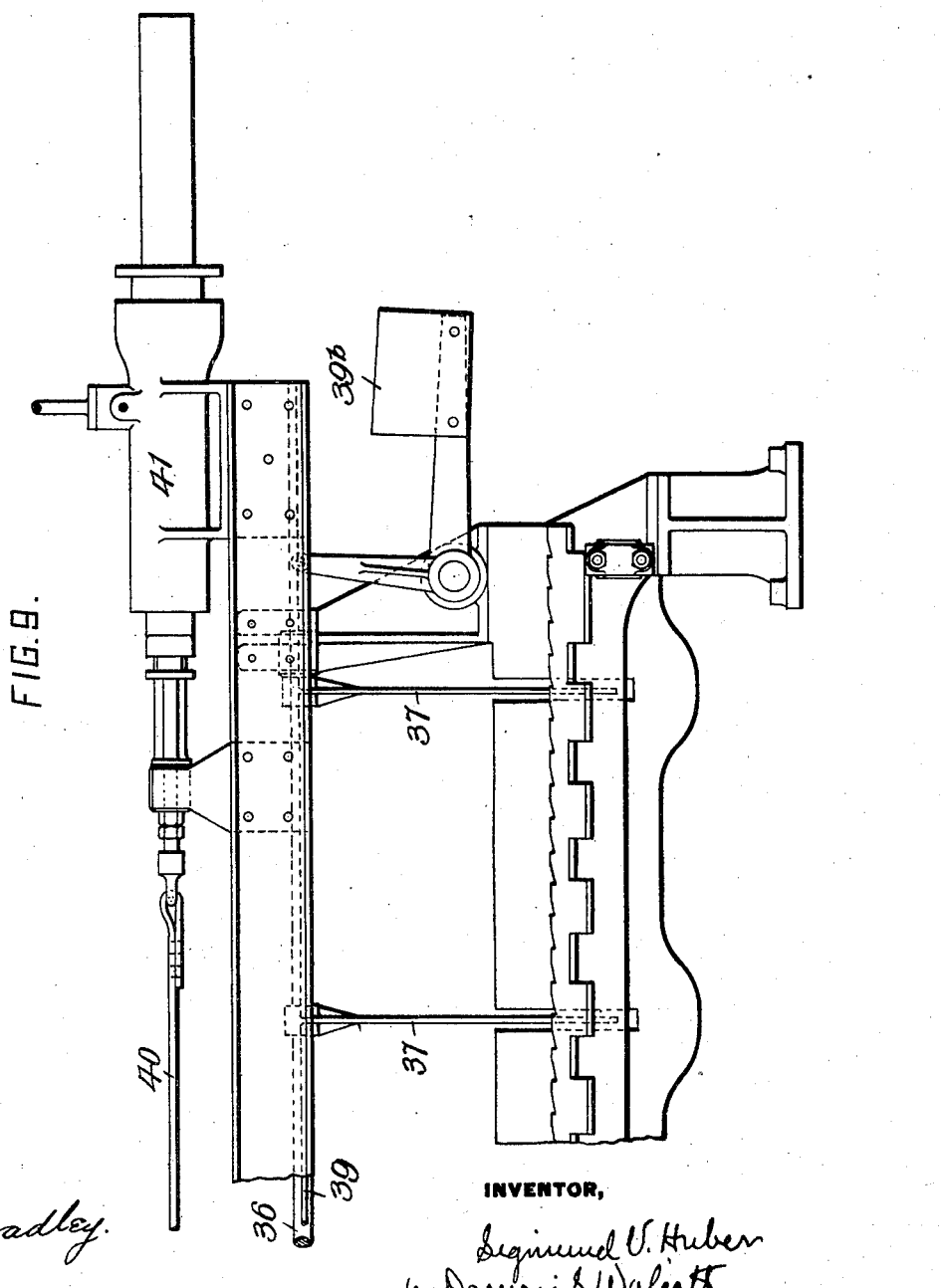

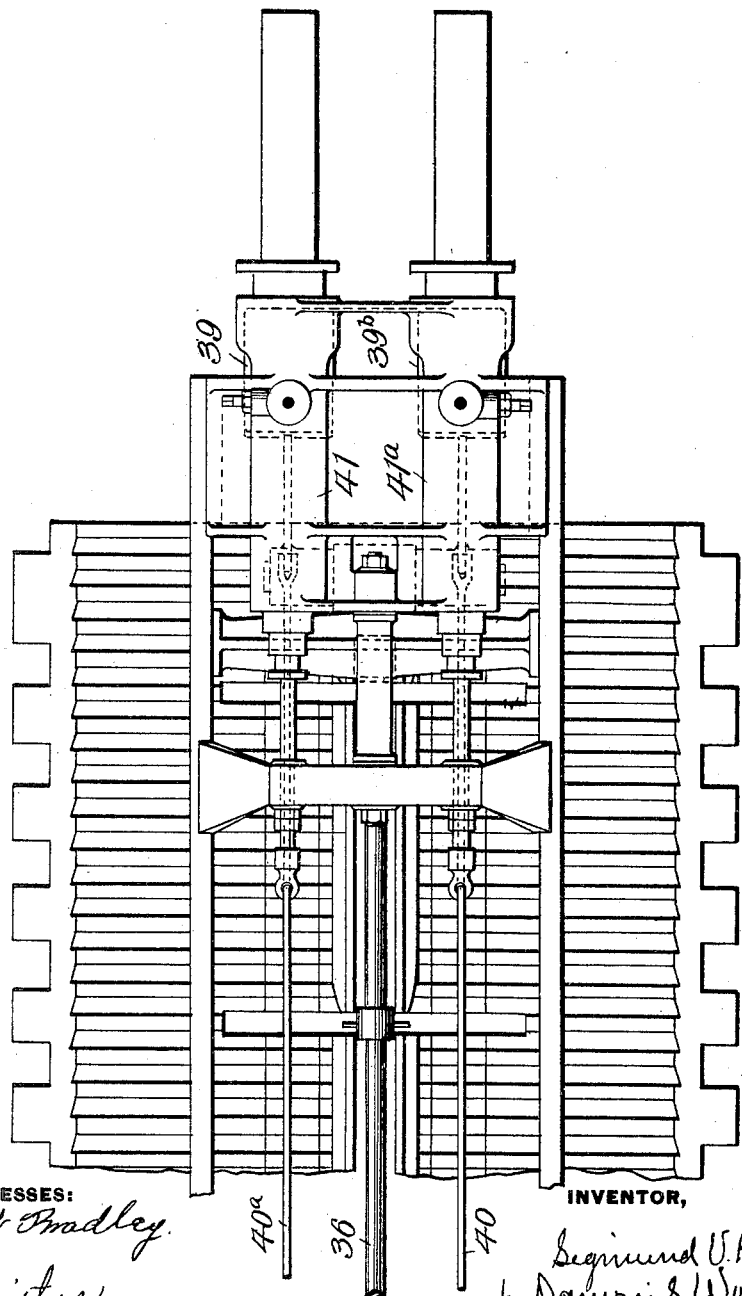

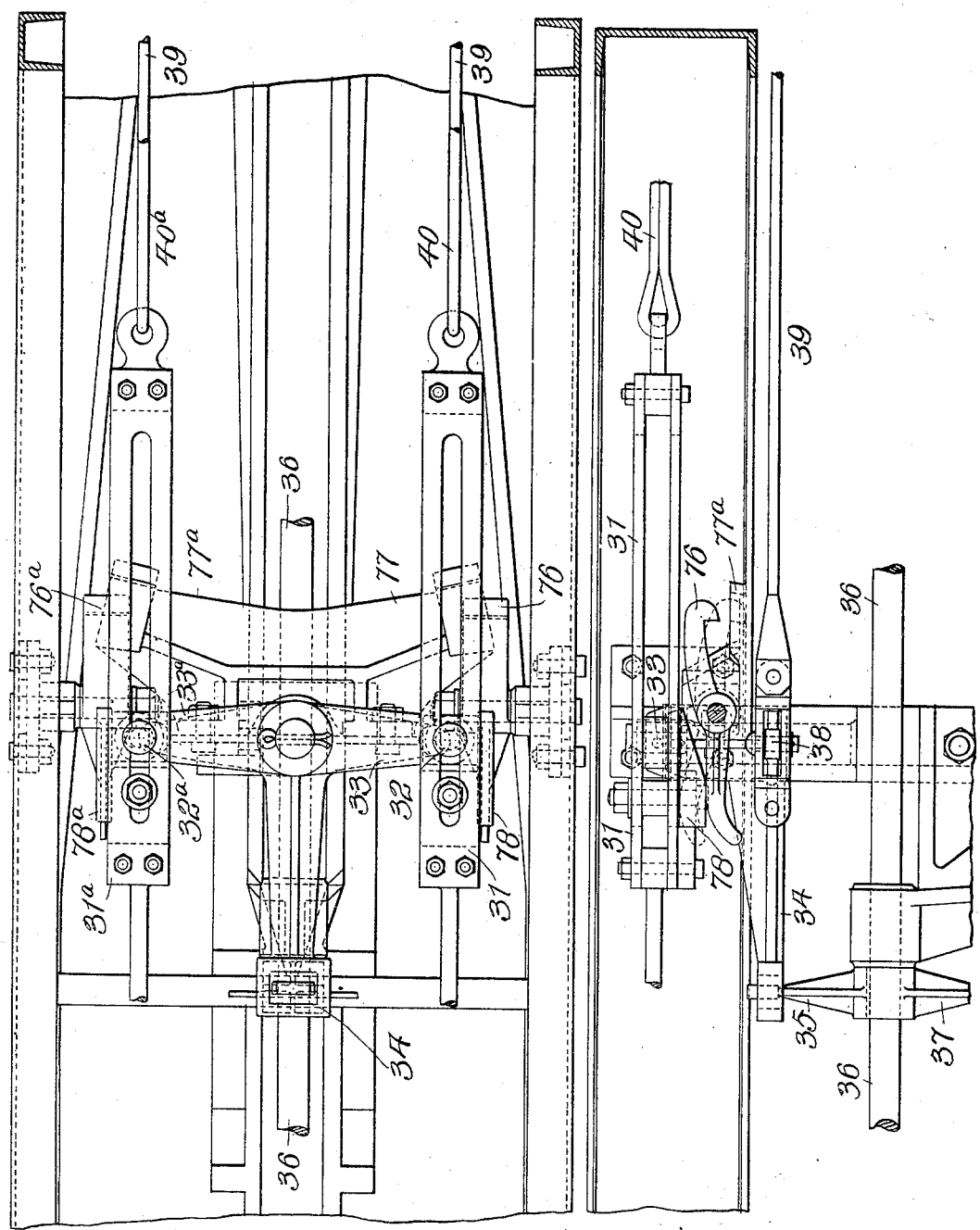

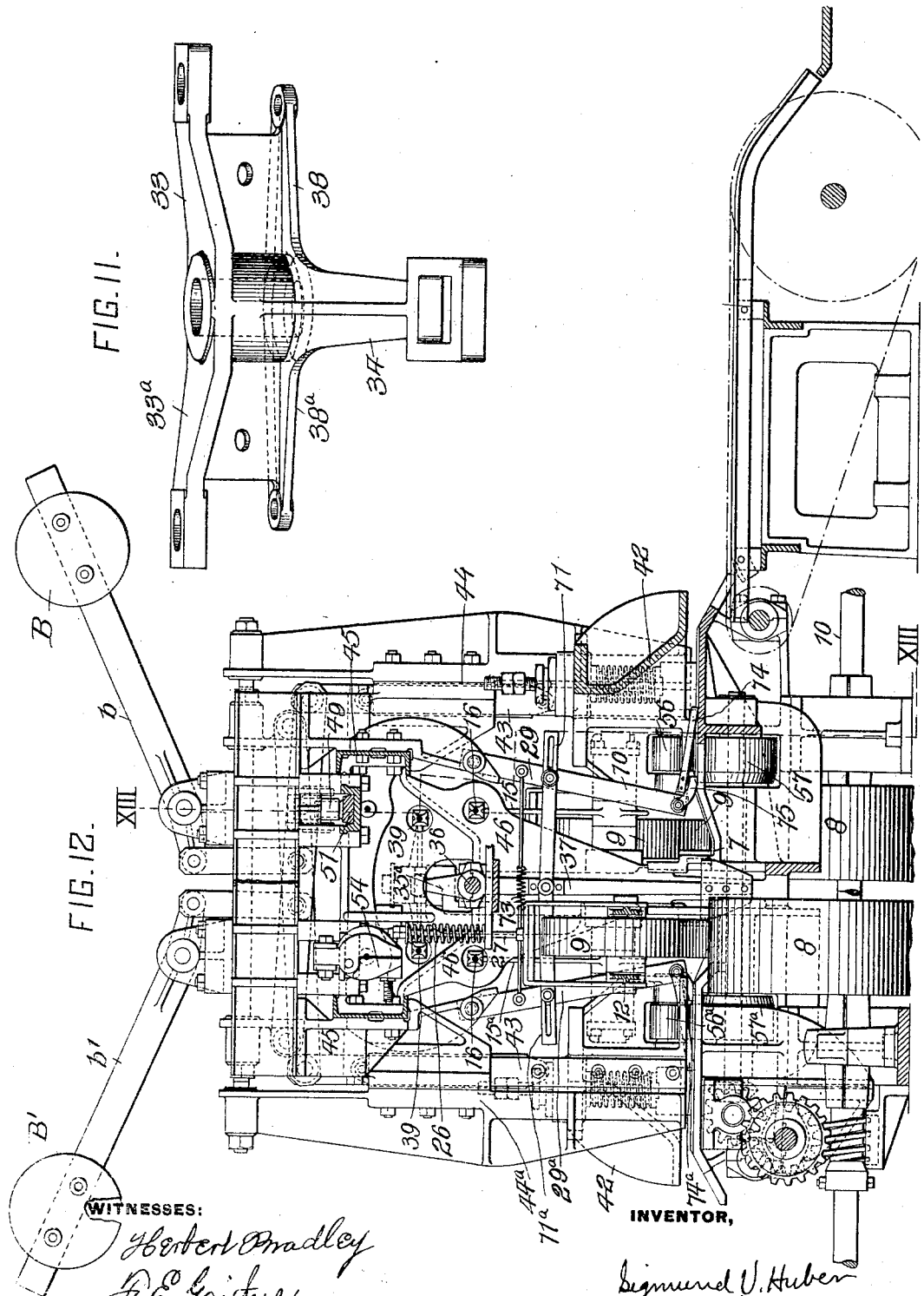

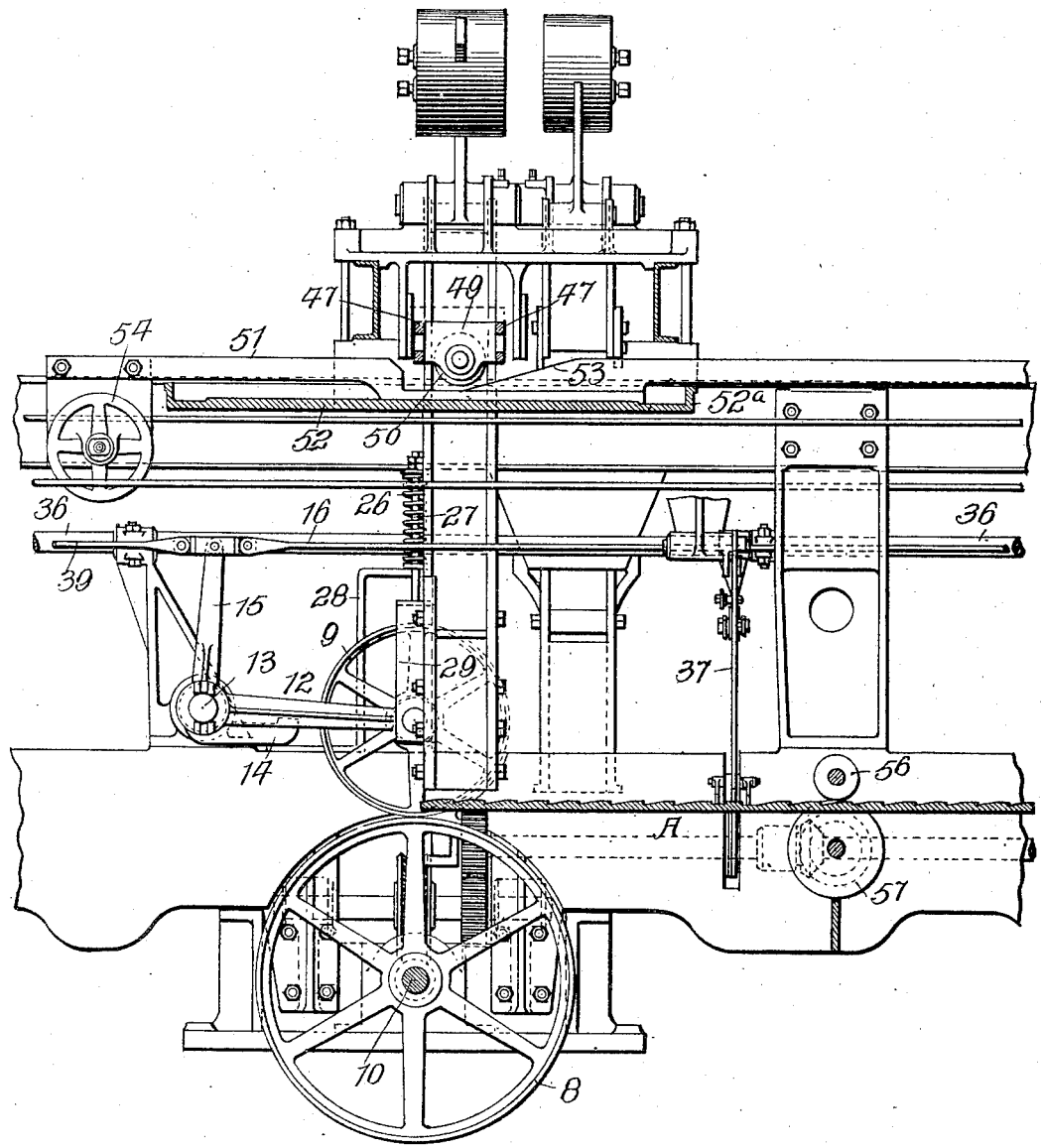

No. 681,642. Patented Aug. 27, 1901.
S. V. HUBER.
RUN-OUT MECHANISM FOR ROLLING MILLS.
(Application filed Jan. 12, 1901.)
(No Model.) 22 Sheets—Sheet 20.
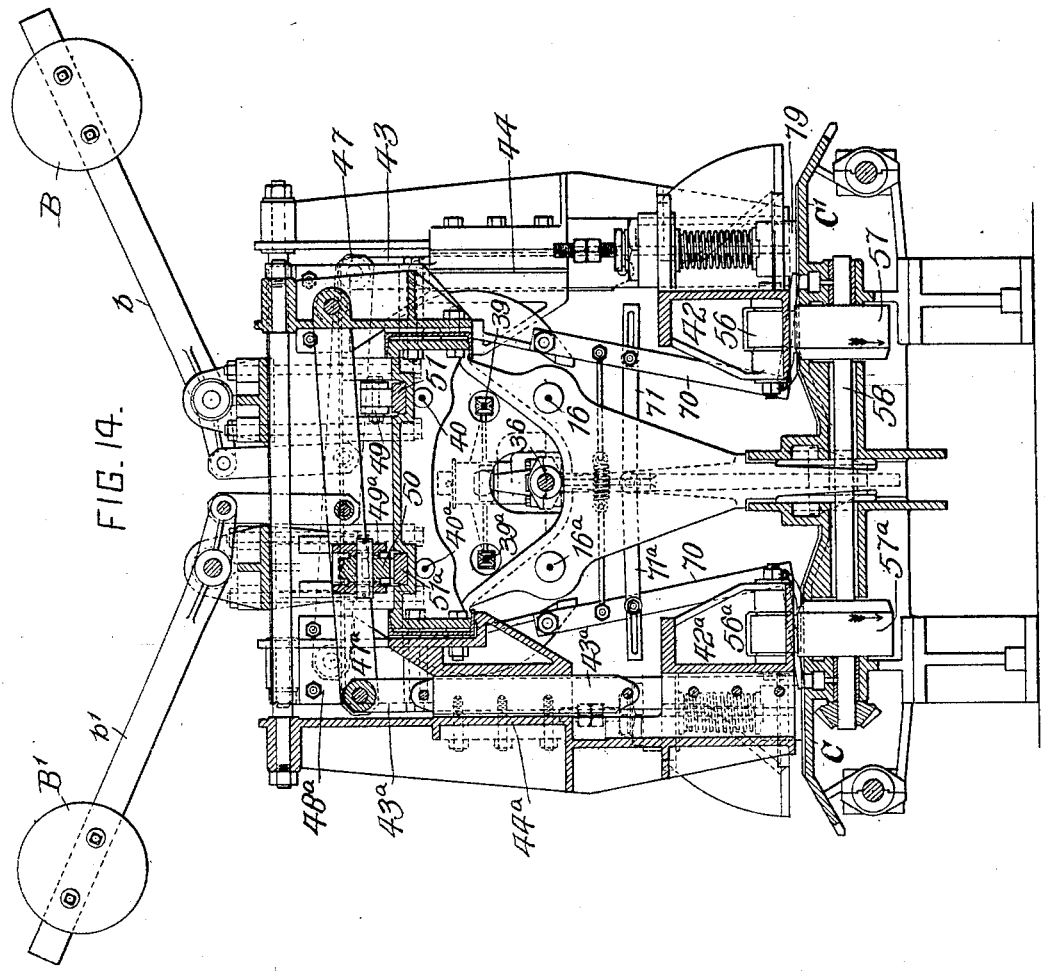
WITNESSES: INVENTOR

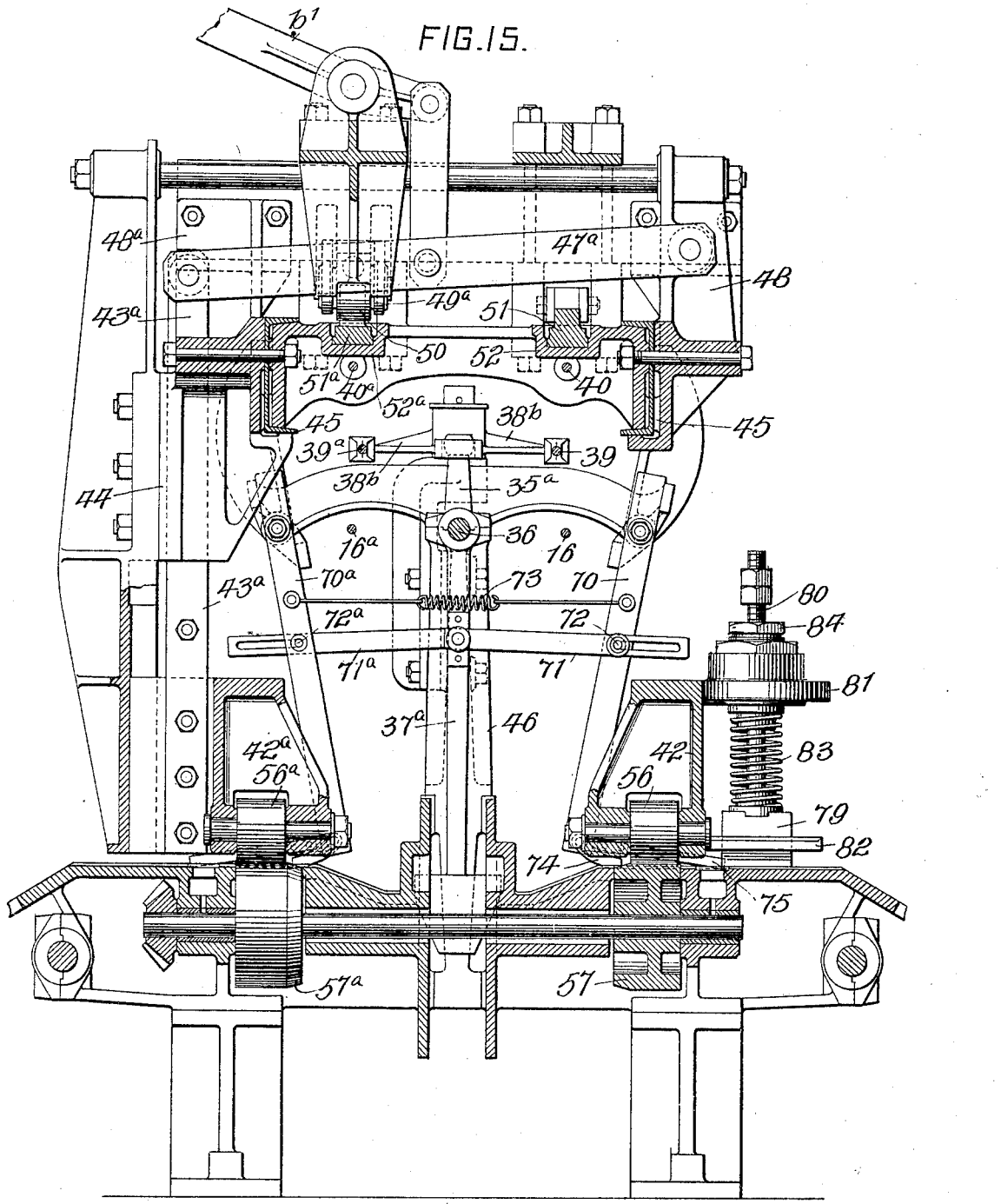

No. 681,642. Patented Aug. 27, 1901.
S. V. HUBER.
RUN-OUT MECHANISM FOR ROLLING MILLS.
(Application filed Jan. 12, 1901.)
(No Model.) 22 Sheets—Sheet 22.
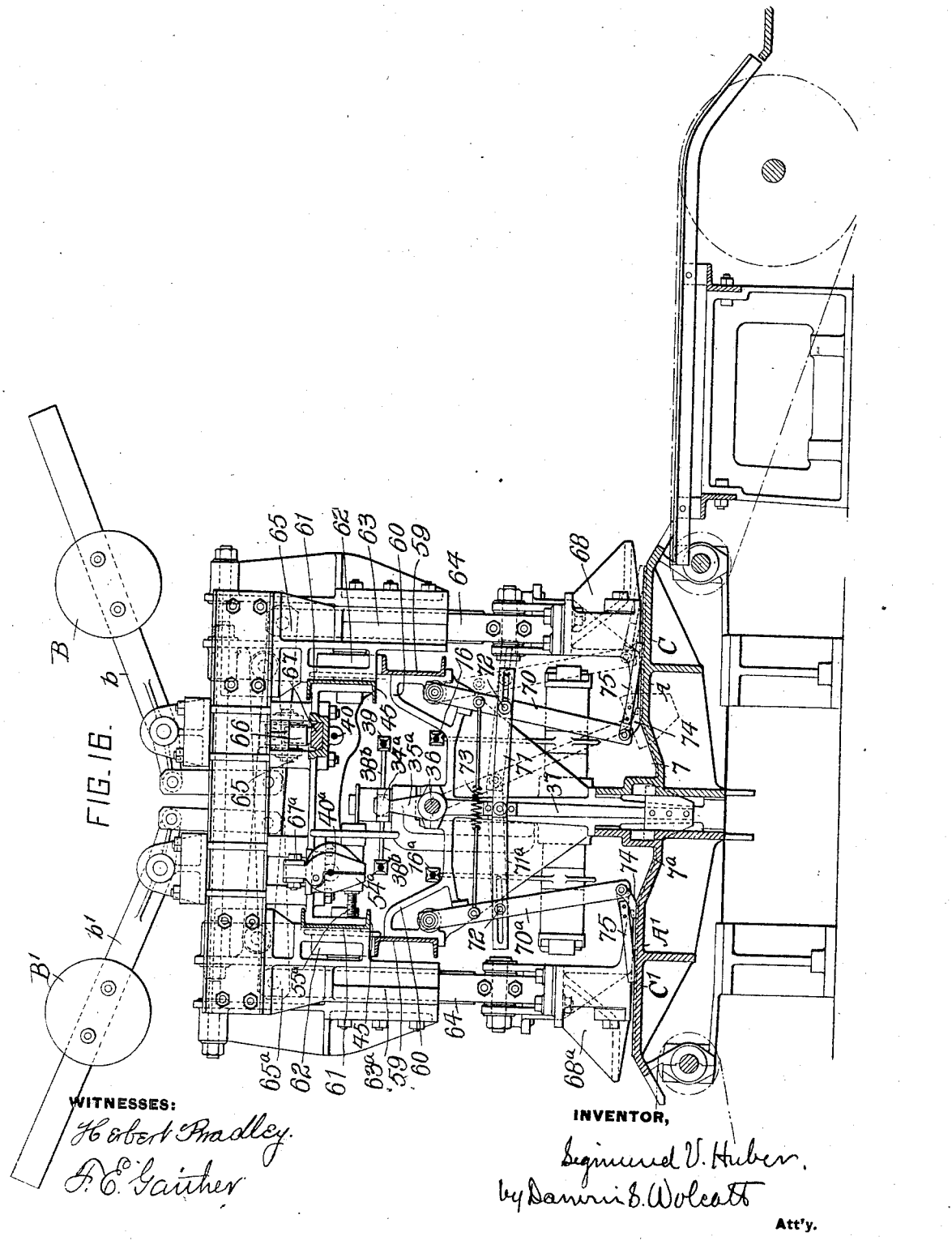

UNITED STATES PATENT OFFICE.

SIGMUND V. HUBER, OF PITTSBURG, PENNSYLVANIA.

RUN-OUT MECHANISM FOR ROLLING-MILLS.

SPECIFICATION forming part of Letters Patent No. 681,642, dated August 27, 1901.

Application filed January 12, 1901. Serial No. 42,956. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Run-Out Mechanism for Rolling-Mills, of which improvements the following is a specification.

The invention described herein relates to certain improvements in run-out mechanism or the mechanism employed for receiving hoop and band iron from the last of the reducing-rolls.

The invention has for its object a construction whereby the hoop-iron may be run out to any desired length, being positively fed during such outward movement, shifted out of the line of feed, subjected to a stretching action, and held in its stretched position until cooled, thereby insuring flat straight strips of metal.

The invention is hereinafter more fully described and claimed.

In the accompanying drawings, forming a part of this specification, Figure 1 is an elevation of the front and rear ends of the run-out mechanism. Figs. 2, 3, 4, 5, 6, 7, 8, and 9 are side elevations of the machine on an enlarged scale. Figs. 2ª, 3ª, 4ª, 5ª, 7ª, 8ª, and 9ª are top plan views of the correspondingly-numbered preceding figures. Figs. 10 and 10ª are plan and side elevations, on an enlarged scale, of the transmitting mechanism whereby the hoops are shifted and stretched. Fig. 11 is an enlarged detail view of the compound lever forming a part of the transmitting mechanism. Fig. 12 is a sectional elevation, the plane of section of the left-hand portion being indicated by the line XII XII and of the right-hand portion of the figure by the line XIIª XIIª, Fig. 4. Fig. 13 is a sectional elevation on the plane indicated by the line XIII XIII, Fig. 12. Fig. 14 is a sectional elevation, the plane of section being indicated by the line XIV XIV, Fig. 5. Fig. 15 is a sectional elevation on a plane indicated by the line XV XV, Fig. 5; and Fig. 16 is a sectional elevation on a plane indicated by the line XVI XVI, Fig. 7.

In the practice of my invention the band or hoop as it emerges from the rolls 1 passes through the trough 2, a portion 2ª thereof being made movable, so as to permit of the guidance of the band or stop into one or the other of the passages *a* or *b* of the trough 3, said trough being divided longitudinally by a partition 4, as clearly shown in Figs. 2 and 2ª. The lateral movement of the movable portion of the trough 2ª is effected by means of a lever 5, connected with the trough by a pitman 6, as shown in Fig. 2ª. The guide portions *a* and *b* of the trough 3 are continuations or front extensions of the receiving-troughs 7 and 7ª, which extend throughout the machine, as clearly shown in Figs. 12 and 16. These troughs or guiding portions 7 and 7ª are formed in the upper surface of the main bed-plate or casting of the machine, such bed-plate or casting being divided into a series of sections dependent upon the length of the material to be rolled. The movement of the strip along this guide-trough is effected by means of a series of positively-driven rollers 8, arranged along the trough and projecting up through the same in connection with a like series of idler-rolls 9, arranged above the positively-driven rollers and serving to press the strip or hoop against the latter. The rollers 8 are mounted upon a series of shafts 10, arranged transversely of the bed of the machine, said shaft being driven by suitable mechanism from the power-shaft of the machine. The rollers 9 are mounted upon short shafts having their ends mounted in forks on the ends of arms 12, loosely mounted on shafts 13. These shafts have arms 14 and 15 keyed thereto, the arms 14 extending under the loosely-mounted arms 12, so as to lift the latter and the rollers 9 when the shafts 13 are rotated. The rotation of these shafts is effected by means of rods 16, connected to the upper ends of arms 15. These rods 16 are connected at their front ends to the upper ends of arms 17 17ª, which have their lower ends connected to shafts 18 18ª, as shown in Figs 2 and 2ª, and these shafts are rotated by means of fluid-pressure cylinders 19 19ª, the connection between the pistons of the cylinders and the shafts being effected by links 20 and 20ª, extending to arms 21 21ª on said shaft. As clearly shown in Figs. 2 and 2ª, these cylinders are connected by pipes 22 22ª to valve mechanisms 23 23ª, which are operated by means of levers 24 24ª, preferably arranged on a platform above the run-out mechanism. As the strip or hoop passes out along the trough 7 or 7ª it will enter between the rollers 8 and 9 and be fed along by them until the rear end of the strip has passed out of the front trough 3. Immediately thereupon the lever 24 or 24ª is shifted so as to admit fluid-pressure into one of the cylinders 19 or 19ª, dependent upon the trough through which the strip is being fed. By the action of the cylinder a pull is exerted on one or the other of the rods 16 or 16ª, so as to raise one or the other of the series of pressure-rollers 9, and thereby stop the onward feed of the strip or hoop. The series of rollers 9 and 9ª are counterbalanced either by means of weights on rearwardly-extending arms 25 25ª, secured on shafts 13, or by means of springs 26 26ª, bearing at their upper ends against collars on pins 27 27ª, which pass down through brackets 28 28ª and are connected to yokes 29 29ª, engaging the shafts of the rollers 9. The lower ends of the spring 26 bear against the brackets 28, as shown in Fig. 3, &c. Either the weighted arm of the spring or both may be employed for counterbalancing the rollers 9, and either or both may be applied to all the rollers or to any desired number, as practice may dictate. By mounting the rollers 9 on arms loosely mounted on their shafts each individual roller may rise or fall without effecting the operating mechanism or the other rollers with thick or thin portions of the strip or band passing between them. As soon as the rear end of the strip has passed beyond the trough 3 and the idler-rollers 9 have been raised as stated, fluid-pressure is admitted into one or the other of the fluid-pressure cylinders 89 89ª, the flow of fluid-pressure to such cylinders being controlled by suitable valve mechanisms 30 and 30ª, as shown in Figs. 2, 2ª, 3, and 3ª. To the pistons of these cylinders are connected slides 31 31ª, as clearly shown in Figs. 3, 3ª, 10, and 10ª. These slides 31 and 31ª are slotted longitudinally, and through these slots pass pins 32 32ª, which are secured in the ends of arms 33 33ª, forming part of a compound lever. Before these slides reach the forward limit of their movement the rear end walls of the slots will bear against the pins 32 32ª, and thereby shift the compound lever. This compound lever is provided with the forwardly-extending arm 34, which is slotted for the reception of the upper end of an arm 35 on the shaft 36, said shaft extending the entire length of the machine. By the oscillation of the compound lever this shaft will be rotated or oscillated in either direction, dependent upon the cylinder 89 or 89ª operated. On the shaft 36 is secured a series of shifting fingers 37 37ª, which are swung back and forth across the machine by the oscillation of the shaft, which, as will be seen by reference to Figs. 12, 14, 15, and 16, is arranged in a vertical plane passing between the guide-troughs 7 and 7ª. With the parts in normal position the fingers 37 37ª will hang between these troughs, and by the oscillation of the shaft the fingers will push a strip laterally out of the troughs onto tables A and A', formed on the bed-plate of the machine immediately outside of the troughs. In order to insure the simultaneous and equal movement of all the fingers 37 37ª, a series of arms 35ª are arranged along the shaft 36 at different points, and these arms engage slots in arms 34ª, formed on levers 38ᵇ, mounted in suitable bearings along the machine. These arms 38ᵇ correspond to arms 38, forming a portion of the compound lever heretofore referred to. The ends of the arms 38 38ª are connected by means of ropes or rods 39 39ª to the ends of each of the arms 38ᵇ throughout the machine, thereby insuring the simultaneous movement of all the shifting fingers 37, and the ends of said rods or ropes are connected to counterbalancing-weights 39ᵇ. To the slides 31 are connected ropes 40 and 40ª, which extend the entire length of the machine and are connected at their rear ends to the pistons of cylinders 41 41ª, in which a constant pressure is maintained sufficient to serve as a counterbalance or retracting cylinder for the clamping mechanisms operated by the cylinders 89 and 89ª. Immediately above the front portions of the table A and A' are arranged carrier-blocks 42 42ª, having their ends secured to slides 43 43ª, mounted in suitable guides 44 44ª, secured to I-beams 45, which are supported in their raised position by a series of suitably-shaped braces 46, extending up from the bed-plate of the machine, as shown in Figs. 4, 4ª, 5, 5ª, 12, 14, 15, and 16. The upper ends of the slides 43 43ª are connected to the ends of levers 47 47ª, which extend across the machine and are pivotally mounted on standards 48 48ª on the opposite sides of the machine. On these levers are secured cradles 49 49ª, having rollers 50. Immediately below these rollers are arranged slides 51 51ª, which move in guides 52 52ª, supported on the frame of the machine. These slides are formed at a suitable point in their length with recesses, and from the recesses extend inclines 53 53ª. When the slides are moved forward, these inclined portions will bear against the rollers 50, thereby raising the levers and the carried blocks 42 42ª, connected thereto. The parts carried by the slides 43 43ª are partially counterbalanced by weights B B', adjustably mounted on levers b b', which are connected by links to the levers 47 47ª. Suitable clamps 54 54ª, consisting of pivotally-mounted jaws adapted to be drawn together by the screws 55 55ª, are secured to the front ends of these slides 51 51ª, and through these jaws pass the ropes or rods 40 40ª, so that when the clamps are tightened on the rope these slides will move with the slides 31 31ª. On the carrier-blocks 42 42ª are mounted idler-rollers 56 56ª, which are adapted to bear against positively-driven rollers 57 57ª. These rollers 57 57ª are secured upon shafts 58, which are rotated in a direction the reverse of that of the feed-rollers 8 and 9, but at a comparatively slow speed, by suitable gear from shaft 10, so that when a strip or hoop has been forced between the rollers 56 and 57 the latter will tend to move or pull the strip or hoop in a reverse direction to the feed effected by the rollers 8 and 9, as shown by arrows in Figs. 4, 13, and 14. Channel-bars 59 are supported by brackets 60, extending up from the bed-plate of the machine, and on these channel-bars is mounted a carriage provided with rollers 62, running along the upper edges of the channel-bars. To the carriage are secured guides 63 63$^a$ for lifting-bars 64 64$^a$, which have their upper ends connected to levers 65 65$^a$, which extend across the machine and have their bearings on the sides opposite the lifting-bars, to which they are connected. On these levers are mounted rollers 66 66$^a$, and beneath the rollers are arranged slides or wedge-pieces 67 67$^a$, similar to the corresponding parts at the front of the machine. These slides 67 and 67$^a$ are provided with clamps 54 54$^a$, which are adapted to engage the ropes 40 and 40$^a$, so that the wedge-pieces 67 67$^a$ will move simultaneously with the wedge-pieces 51 51$^a$. By reference to Figs. 7, 7$^a$, 8, and 8$^a$ it will be seen that two lifting mechanisms are connected together by channel-bars 61, forming a carriage for the clamping-blocks. The carriage is preferably made of a considerable length for purposes hereinafter described. By arranging the inclines of the wedge-pieces 67 67$^a$ of the front lifting mechanisms of the carriage at a different angle or making the inclines thereof a little longer than the rear mechanisms the levers at the front end of the carriage can be operated slightly ahead of those at the rear of the carriage, so that the clamping-blocks 68 68$^a$, connected to the lower ends of the lifting-bars 64 64$^a$, can be raised and lowered in such manner that its rear end will bear upon a strip lying on the beds A A' before the front end will have a bearing. The clamping-blocks 68 68$^a$ are provided with upwardly-extending ears 69, between which the lifting-bars 64 64$^a$ extend, and the latter are connected to these lugs or ears by bolts 70 70$^a$, as shown in Figs. 8 and 16, so as to allow of the lowering of the rear ends of the clamping-blocks in advance of the front ends thereof. On the admission of fluid-pressure to the cylinder 89 the carrier-block 42 at the front end of the machine and the clamping-block 68 at the rear end of the machine will be raised prior to the movement of the fingers 37 37$^a$, such priority of movement being permitted by the longitudinal slot in the slide 31, so that a strip or hoop can be shifted onto the table A and below the carrier-block 42 and the clamping-block 68. As soon as the strip has been shifted into position on the table A fluid-pressure is admitted to the opposite end of the cylinder 89$^a$ or allowed to escape from the cylinder 89, so that the cylinder 41 at the rear end of the run-out will effect a reverse pull on the rope 40 and the slide 31, so as to permit of the lowering of the carrier-block and clamping-block upon the strip. The clamping-block 68 will firmly clamp the forward end of the strip onto the table A, while the rollers 56 and 57 will by their reverse rotation exert a pull on the rear end of the strip, thereby subjecting the strip to a straightening stretch or pull. In order to effect the movement of the stretched strip or hoop from the tables A A' onto the cooling-tables C C' and also off of the latter tables, arms 70 and 70$^a$ are pivotally mounted on the machine and are connected to the fingers 37 by means of rods 71 71$^a$, which have their outer ends slotted. The pins 72, passing through the slots in the bars 71 71$^a$, are held in the inner end of the slot by means of the spring 73, having its ends connected to the arms 70 70$^a$, so that the arms 70 will always move with the fingers 37; but the latter can move independent of the arms. To the lower ends of the arms 70 are pivotally connected dogs 74 74$^a$ and 75 75$^a$, which are constructed, respectively, to push the strip from the tables A A' onto the tables C C' and from off the tables B B'. As the strip or hoop coming from the mill may be twisted or bent, it is desirable that the fingers 37 should hold the strip in position on the tables A A' until after the carrier-block and clamping-head have been lowered onto the strip, as described. To this end hooks 76 76$^a$ are pivotally secured to the side frames of the machine in such manner that when the ends of the compound lever are drawn back the hooks will engage one or the other end of arms 77 77$^a$, carried by the compound lever, as shown in Figs. 10 and 10$^a$—as, for example, when the arms 33 and 38 of the lever are moved to the left in Fig. 10 the hook 76 will engage the arm 77 and hold these arms and the fingers 37 from return movement with the slide 31, and inclined shoulder 78 on the slide at or near its front strikes and depresses the tail of the hook, raising the latter out of engagement with the arm 77, thereby permitting the shifting of the compound lever and fingers 37 37$^a$ in the opposite direction by the fluid-pressure cylinder 89$^a$ and slide 31$^a$.

It is frequently desirable to employ the contraction of the metal during cooling to effect the stretching thereof, and to this end auxiliary clamping mechanisms are arranged upon the carrier-blocks 42 and the clamping-blocks 68, in such manner as to bear upon the strip or hoop while it is resting upon the table B. These clamping mechanisms consist of presser-feet 79, attached to the lower end of rods 80, said parts being guided in lugs 81 and 82, projecting from the sides of the carrier and clamping blocks. Springs 83 are interposed between shoulders on the stems 80 and adjusting-screws 84, passing through the upper flanges 81. As the carrier and clamping blocks are lowered, as heretofore described, these presser-feet will bear upon the strip or hoop lying on tables C C' near its ends, holding the same firmly during the cooling and consequent contraction thereof.

In the operation of my invention the hoop or other article is directed by the movable section of trough 2 as it comes from the last pass of the reducing-rolls into one or the other of the grooves in trough 3—as, for example, into the groove $a$. From the groove $a$ it passes along the trough 7, being carried forward by the feed-rollers 8 and 9. As the rear end of the hoop passes out of the trough 3 the lever 24 of valve mechanism 23 is shifted so as to admit fluid into cylinder 16, which, operating through the described mechanism, will exert a pull on rod or rope 16 to lift the feed-rollers 9, and thereby stop the onward movement of the hoop or strip. Valve 30 is now shifted to admit fluid-pressure in cylinder 89 to shift slide 31. By the first movement of the slide 31 the wedge-like slides 51 and 67 are shifted longitudinally through the medium of the rope or rod 40 to raise the carrier and clamping blocks 42 and 68. During the latter part of the slide 31 the compound lever will be shifted, the end wall of the slot in the slide striking against the pin 32 at the end of arm 33 of the compound lever. By the movement of the compound lever a pull is exerted on the rope or rod 39, thereby shifting the fingers 37 37$^a$, which will by their movement slide the hoop or strip from the trough 7 onto table A under the carrier and clamping blocks 42 and 68. As the fingers swing outward the dogs 74 and 75 will push the hoops from the tables A and C. The carrier and clamping blocks 42 and 68 are now lowered by a reverse movment of the slides 31 and the wedge-like slides 51 and 67. The rear or clamping blocks 68 firmly clamp the front end of the hoop onto the table and the rollers 56 and 57 bite the hoop near its rear end. As these rollers rotate in a direction reverse to the feed of the hoop, they will exert a strong pull on the hoop, and thereby stretch and straighten the same. During the first portion of the return movement of the slide 31 the compound lever will be held stationary by the hooks 76, and consequently the fingers will not swing inwardly until after the hoop is gripped by the rollers 56 and 57 and block 68. As the hoop is quite hot when shifted from table A onto table B, considerable contraction will occur while resting thereon. This contraction is utilized to stretch the hoop by clamping it at or near its ends onto the table C by the auxiliary clamping-blocks or presser-feet 79, carried by the blocks 42 and 68. While the hoop or strip is being shifted onto table A and stretched, as described, another hoop or strip is directed by the shifting of the movable section of trough 2 along groove $b$ of trough 3 and along trough 7$^a$. As soon as the first strip is gripped by the stretching mechanism the fingers 37 37$^a$ are swung to shift the second hoop or strip onto table A' and the stretching mechanism on that side of the machine operated, as described.

It will be understood by those skilled in the art that only one side of the machine can be used provided the fingers 37 37$^a$ are swung to middle position before the second strip is fed into trough 7 or provision made whereby the fingers can swing past a hoop or strip lying in the trough. While not necessary, it is desirable to employ a larger number of shifting fingers than of devices for shifting the hoop from tables A and B, and, further, the auxiliary arms 38$^b$ for rotating shaft 36 are not necessary, but are desirable to avoid torsion of the shaft, which is quite long. When using the auxiliary arms 38$^b$, the shaft 36 may be made in sections. As described, the clamping-blocks 68 and their operating mechanisms are mounted on a carriage or otherwise movable longitudinal of the machine, which is thereby adapted for operating on hoops or strips of different lengths. In order to hold the carriage in different positions, dogs 85 are pivoted to the channel-bars 61 in such manner as to swing down and engage the channel-bars 59 of the frame of the machine, as shown in Figs. 7 and 7$^a$.

I claim herein as my invention—

1. In a run-out mechanism for hoop and other mills, the combination of mechanism for effecting the outward feed of the article, mechanism for stretching or pulling said article and mechanism for shifting the article laterally from the feed to the stretching mechanism, substantially as set forth.

2. In a run-out mechanism for hoop and other mills, the combination of two mechanisms for effecting the outward feed of the articles, means for directing the articles to one or the other of said feed mechanisms, two mechanisms for stretching or pulling the articles and mechanism for shifting the articles from the feed mechanisms to the stretching mechanisms, substantially as set forth.

3. In a run-out mechanism for hoop and other mills, the combination of mechanism for effecting the outward feed of the article, mechanism for stretching or pulling the article and mechanism for preventing the contraction of the article during cooling, substantially as set forth.

4. In a run-out mechanism for hoop and other mills, the combination of mechanism for effecting the outward feed of the articles, mechanism for stretching or pulling the articles, mechanism for preventing the contraction of the articles during cooling and mechanism for shifting the articles from the feed mechanism to the stretching mechanism and from the latter to the holding mechanism, substantially as set forth.

5. In a run-out mechanism for hoop and other mills, the combination of means for clamping or holding one end of the article, means for exerting an acting pull on the opposite end of the article and means for causing the pulling and holding mechanism to engage the ends of the article successively, substantially as set forth.

6. In a run-out mechanism for hoop and other mills, the combination of means for clamping or holding one end of the article, a positively-driven roller and a roller movable toward and from the driven roller, said rollers being arranged to engage the opposite end of the article, substantially as set forth.

7. In a run-out mechanism for hoop and other mills, the combination of mechanism for effecting the outward feed of the article, means for gripping or clamping the front end of the article, a roller driven in a direction opposite the feed of the article and a roller movable toward and from the driven roller, said rollers being arranged to engage the rear end of the article, substantially as set forth.

8. In a run-out mechanism for hoop or other mills, the combination of mechanism for gripping or clamping one end of the article, mechanism for exerting an active pull on the opposite end of the article and means for simultaneously shifting said mechanism to engage the ends of the article, substantially as set forth.

9. In a run-out mechanism for hoop and other mills, the combination of mechanism for effecting an outward feed of the article, mechanism for effecting an active pull or stretch on the article, mechanism for shifting the article laterally from the feed mechanism to the stretching mechanism and means for operating the shifting and stretching mechanisms in succession, substantially as set forth.

10. In a run-out mechanism for hoop and other mills, the combination of a feed mechanism, a pulling or stretching mechanism, a mechanism for shifting the article from the feed mechanism to the stretching mechanism, means for operating shifting and stretching mechanisms in succession and means for holding the shifting mechanism in position to which it has been shifted, during the movement of the stretching mechanism to engage the article, substantially as set forth.

11. In a run-out mechanism for hoop and other mills, the combination of carrier and clamping blocks arranged at a distance apart dependent upon the length of the article to be operated on, slides connected to said blocks, movable wedges operative through suitable connections to shift the slides, and means for simultaneously shifting the wedges, substantially as set forth.

12. In a run-out mechanism for hoop and other mills, the combination of movable carrier and clamping blocks arranged at a distance apart dependent on the length of the article to be operated on, a supporting-bed, a positively-driven roller projecting through the bed at or near one end thereof, a roller mounted on the carrier in line with the driven roller, and presser-feet carried by said blocks, substantially as set forth.

In testimony whereof I have hereunto set my hand.

SIGMUND V. HUBER.

Witnesses:
DARWIN S. WOLCOTT,
F. E. GAITHER.